United States Patent [19]

Concannon et al.

[11] Patent Number: 5,149,456
[45] Date of Patent: Sep. 22, 1992

[54] DETERGENT COMPOSITIONS COMPRISING A HYDROTALCITE-LIKE MATERIAL FOR REDUCING COLORANT MIGRATION

[75] Inventors: Martin Concannon, West Kirby; Maurice Webb, Vicars Cross; Keith R. F. Cockett, Nr Wigan, all of Great Britain

[73] Assignee: Lever Brothers Company, Division of Conopco, Inc., New York, N.Y.

[21] Appl. No.: 621,483

[22] Filed: Dec. 3, 1990

[30] Foreign Application Priority Data

Dec. 4, 1989 [GB] United Kingdom ............... 8927363

[51] Int. Cl.$^5$ ............................................... C11D 3/12
[52] U.S. Cl. ............................... 252/174.25; 252/175; 252/179
[58] Field of Search ................ 252/174.25, 175, 179

[56] References Cited

U.S. PATENT DOCUMENTS

| | | | |
|---|---|---|---|
| 3,002,932 | 10/1961 | Duwell et al. | 252/179 |
| 3,932,295 | 1/1976 | Fujino et al. | 252/102 |
| 4,123,376 | 10/1978 | Gray | 252/95 |
| 4,148,742 | 4/1979 | Crutchfield et al. | 252/102 |
| 4,239,659 | 12/1980 | Murphy | 252/542 |
| 4,446,042 | 5/1984 | Leslie | 252/102 |
| 4,493,773 | 7/1985 | Cook et al. | 252/8.8 |
| 4,634,544 | 1/1987 | Weber et al. | 252/99 |
| 4,661,282 | 4/1987 | Clark | 252/179 |
| 4,756,849 | 7/1988 | Weber et al. | 252/542 |
| 4,929,381 | 5/1990 | Clark | 252/174.25 |

FOREIGN PATENT DOCUMENTS

| | | |
|---|---|---|
| 1265115 | 1/1990 | Canada. |
| 0206799 | 12/1986 | European Pat. Off.. |
| 0207707 | 1/1987 | European Pat. Off.. |
| 3819191 | 7/1989 | Fed. Rep. of Germany. |

*Primary Examiner*—Paul Lieberman
*Assistant Examiner*—Erin M. Higgins
*Attorney, Agent, or Firm*—Ronald A. Koatz

[57] ABSTRACT

A detergent composition comprising a detergent active system, and a hydrotalcite-like material as defined in formula I, $$M_{k+m}N_{n+p}(OH)_2A_2{}^{Y-}{}_x \cdot H_2O \qquad I$$

M is any 1+ or 2+ cation or combination thereof;
N is any 3+ or 4+ cation or combination thereof;
K is the sum of the individual mole fractions of the 1+ cations;
m is the sum of the individual mole fractions of the 2+ cations;
n is the sum of the individual mole fractions of the 3+ cations;
p is the sum of the individual mole fractions of the 4+ cations where either but not both of k and m or n and p can be zero and k+m+n+p=1.

such compositons can be effective in removing unwanted colorants from detergent wash liquors thereby reducing colorant transfer in the wash.

6 Claims, No Drawings

DETERGENT COMPOSITIONS COMPRISING A HYDROTALCITE-LIKE MATERIAL FOR REDUCING COLORANT MIGRATION

A first aspect of the present invention relates to detergent compositions; particularly it relates to a fabric-washing detergent composition having improved colour care properties and a second aspect of the present invention relates to a method of controlling colourant migration for example between textile materials in a liquid.

When washing mixed coloured fabrics, various factors can contribute to a loss of colour brightness, for example redeposition of soil from the wash liquor may result in colour dulling. When washing mixed coloured or (mixed) coloured and white fabrics there is a risk of colorant transfer through the wash liquor from one fabric to another or bleeding of colours in the same fabric which will result in discoloration, loss of colour brightness and/or staining of the fabric.

In textile production processes it is often necessary to produce or finish textiles using 'wet' processes. Again there is a risk of colorant transfer. For example, garments woven or knitted from a mixture of coloured yarns often need to be wet finished or scoured to achieve maximum fastness When printed textiles are produced it is often necessary to wash off unbound dye and this process can result in dye transfer onto unprinted or differently coloured areas. These colorant transfer processes may give the same undesirable results as are encountered in fabric washing. With fashion moving towards coloured clothing and textile materials, especially multi-coloured the problem of colourant transfer in liquids has become more acute.

Various proposals have been made in the art to resolve the problem of colorant transfer but, in the main, they have relied on compositions with bleaching systems to remove excess colorants from solution. The main drawback of these compositions is that they exert a rather strong direct fabric or textile dye bleaching, tending to cause fading of the coloured fabrics or textiles.

EP 0 206 799 (The Dow Chemical Company) discloses certain crystalline anion exchange materials represented by a formula, the materials consisting of complex inorganic salts of mixed metal hydroxides and hydrated oxides having an excess positive charge. The charge is said to be balanced by an exchangeable anion. Possible uses of the anion exchange material are said to be in controlling colourant migration in a liquid, in laundering clothes, in removing sulphonated polystyrene from corn syrup and for forming pigments The formula of the anion exchange material excludes those crystalline salts where substantially no oxide is present.

EP 0 207 707 (The Dow Chemical Company) discloses certain anion exchange materials with anion exchange properties above 160° C. The materials are represented by the same formula as the materials of EP 0 206 799. Possible uses are said to be removing chromates or dichromates from waste water streams, removing silicates from industrial boiler systems or removing dye migration from one item to another.

The composition for laundering clothes proposed by EP 0 206 799 suffers from the disadvantage that it will be an inefficient detergent composition. Efficient washing of mixed coloured or coloured and white fabrics requires not only control of colourant transfer but also efficient cleaning of the fabric.

EP 0 345 587A (Henkel KGaA) discloses the use of cationic, non-silicate layer compounds having the general formula (a)

$$Mg_x Al(OH)_y A_z \cdot nH_2O \qquad (a)$$

where A is a non-silicate anion, and $1<x<5$, $y>z$, $(y+z)=2x+3$, an $0<n<10$ in a detergent composition comprising 8% by weight of alkyl benzene sulphonate and 5% by weight of (a). The non-silicate layer compound is said to reduce fabric encrustation caused by zeolite-containing detergent compositions.

The present invention seeks to mitigate the disadvantages of the prior art and provide an alternative material for controlling colorant migration in a liquor.

Thus, the present invention concerns other anion exchange materials being related to a compound of the formula $Mg_6Al_2(OH)_{16}CO_3 \cdot 4H_2O$ known as hydrotalcite in any form, and for convenience referred to hereinafter as hydrotalcite-like materials.

The hydrotalcite-like materials useful in detergent compositions of the present invention or in method of reducing colourant migration in a liquid according to the present invention can be described by formula I below:

$$M_{k+m} N_{n+p} (OH)_2 A_z^{y-} x.H_2O$$

where:

M is any 1+ or 2+ cation or combination thereof

N is any 3+ or 4+ cation or combination thereof k is the sum of the individual mole fractions of the 1+ cations m is the sum of the individual mole fractions of the 2+ cations n is the sum of the individual mole fractions of the 3+ cations p is the sum of the individual mole fractions of the 4+ cations where either but not both of k and m or n and p can be zero and $k+m+n+p=1$.

$A_z^{y-}$ is any anion of charge $y-$ and mole fraction z, or combination of anions of similar or differing $y-$ and $k+2m+3n+4p-2-zy=0$ and x can range from 1 to 100.

Examples of the cations M in the above formula are $Li^+$, $Mg^{2+}$, $Zn^{2+}$, $Fe^{2+}$, $Cu^{2+}$, $Sn^{2+}$, $Ca^{2+}$ and $Sr^{2+}$. Suitable N cations include $Al^{3+}$, $Fe^{3+}$, $Ti^{4+}$ and $Sn^{4+}$.

Preferred divalent cations are $Zn^{2+}$, $Cu^{2+}$ or $Mg^{2+}$ or a combination of these ions, or a combination with other divalent cations.

The anion A may be an inorganic or organic anion. Preferred inorganic anions A are $Cl^-$, $NO_3^-$, $SO_4^{2-}$, $CO_3^{2-}$ and $OH^-$. Examples of organic anions are carboxylate ions such as citrate and stearate.

Examples of hydrotalcite-like materials of this invention are:

$$Zn_{16} Al_2 (OH)_{36} (Cl_2) xH_2O$$

$$Mg_6 Al_2 (OH)_{16} (NO_3)_2 xH_2O$$

$$Cu_{16} Al_2 (OH)_{36} (Cl_2) xH_2O$$

Accordingly, a first aspect of present invention provides a detergent composition comprising a) a detergent active system, and b) a hydrotalcite-like material as defined in formula I.

Preferably the hydrotalcite-like material is present in the liquid at a concentration of at least 0.1 g/l, more preferably at least 0.5 g/l, most preferably at least 1 g/l. The hydrotalcite-like material is preferably present in the detergent composition of the invention at a level of at least 1% by weight, more preferably at least 5% by weight, most preferably between 5% by weight and 30% by weight.

Such compositions can be effective in removing unwanted colorants from detergent wash liquors thereby reducing colorant transfer in the wash and the tendency for fabrics to become dull after washing.

While not wishing to be bound by theory it is thought that hydrotalcite-like materials control colorant transfer in a liquid by adsorbing anionic species such as dyes thus preventing their redeposition on the fabric or textile. In a wash liquor or textile production process it is therefore important that the anion exchanger adsorbs relatively quickly since in the low liquor to cloth ratios commonly encountered in the textile industry or in a typical fabric washing situation where differently coloured fabrics are in close proximity, the redeposition of colorants can occur speedily due the abundance of available redeposition sites.

Factors affecting the rate of colorant adsorbtion by hydrotalcite-like materials have been found to be the temperature of the liquid medium, the average particle size of the hydrotalcite-like material, the morphology of the material and the pH of the liquid medium.

Preferably the hydrotalcite-like material has a particle size (as measured by light scattering), less than 250 $\mu$m, more preferably less than 100 $\mu$m.

Since the hydrotalcite like materials are anion exchangers it is preferred that the detergent active system is non-anionic, preferably nonionic in nature. In particular, the detergent active system can comprise at least 25% by weight of the system of nonionic detergent active preferably at least 30%, more preferably 40% by weight of the system. In this way compositions according to the invention may provide not only good colour care for mixed coloured/white fabric loads but also provide an efficient detergent composition.

Examples of suitable nonionic surfactants that can be included in the detergent active system include:

1. The polyethylene oxide condensates of alkyl phenol, e.g. the condensation products of alkyl phenols having an alkyl group containing from 6 to 12 carbon atoms in either a straight chain or branched chain configuration, with ethylene oxide, the said ethylene oxide being present in amounts equal to 3 to 30, preferably 5 to 14 moles of ethylene oxide per mole of alkyl phenol. The alkyl substituent in such compounds may be derived, for example, from polymerised propylene, diisobutylene, octene and nonene. Other examples include dodecylphenol condensed with 9 moles of ethylene oxide per mole of phenol; dinonylphenol condensed with 11 moles of ethylene oxide per mole of phenol; nonylphenol and disooctylphenol condensed with 13 moles of ethylene oxide.

2. The condensation product of primary or secondary aliphatic alcohols having 8 to 24 carbon atoms, in either straight chain or branched chain configuration, with from 2 to about 40 moles, preferably 2 to about 9 moles of ethylene oxide per mole of alcohol. Preferably, the aliphatic alcohol comprises between 9 and 18 carbon atoms and is ethoxylated with between 2 and 9, desirably between 3 and 8 moles of ethylene oxide per mole of aliphatic alcohol. The preferred surfactants are prepared from primary alcohols which are either linear (such as those derived from natural fats or prepared by the Ziegler process from ethylene, e.g. such as the Lutensols, Dobanols and Neodols which have about 25% 2-methyl branching (Lutensol being a Trade Name of BASF, Dobanol and Neodol being Trade Names of Shell), or Synperonics, which are understood to have about 50% 2-methyl branching (Synperonic is a Trade Name of ICI) or the primary alcohols having more than 50% branched chain structure sold under the Trade Name Lial by Liquichimica. Specific examples of nonionic surfactants falling within the scope of the invention include Dobanol 45-4, Dobanol 45-7, Dobanol 45-9, Dobanol 91-2.5, Dobanol 91-3, Dobanol 91-4, Dobanol 91-6, Dobanol 91-8, Dobanol 23-6.5, Synperonic 6, Synperonic A7, Synperonic 14, the condensation products of coconut alcohol with an average of between 5 and 12 moles of ethylene oxide per mole of alcohol, the coconut alkyl portion having from 10 to 14 carbon atoms, and the condensation products of tallow alcohol with an average of between 7 and 12 moles of ethylene oxide per mole of alcohol, the tallow portion comprising essentially between 16 and 22 carbon atoms. Secondary linear alkyl ethoxylates are also suitable in the present compositions, especially those ethoxylates of the Tergitol series having from about 9 to 15 carbon atoms in the alkyl group and up to about 11, especially from about 3 to 9, ethoxy residues per molecule.

The compound formed by condensing ethylene oxide with a hydrophobic base formed by the condensation of propylene oxide with propylene glycol. The molecular weight of the hydrophobic portion generally falls in the range of about 1500 to 1800. Such synthetic nonionic detergents are available on the market under Trade Name of "Pluronic", supplied by Wyandotte Chemicals Corporation.

When the detergent active system comprises a mixture of anionic and nonionic actives, the preferred nonionic material or mixtures thereof for use in this invention will have an HLB (hydrophillic-lipophilic balance) of not more than 10.5, preferably in the range of from 6 to 10, most preferably in the range of 8 to 9.5. As explained, the composition can contain one or a mixture of more than one nonionic detergent-active materials. The mixture can contain one or more nonionic materials having an HLB of more than 10.5, providing the average HLB of the mixture of nonionic materials is not more than 10.5. The HLB scale is a known measure of hydrophiliic-lipophilic balance in any compound. It is fully defined in the literature, for example in "Nonionic Surfactants", Volume 1, edited by M J Schick. A method of determining the HLB of a mixture of non-ionic materials is also defined in this reference.

Preferred nonionic materials are the alkoxylate adducts of fatty compounds selected from fatty alcohols, fatty acids, fatty esters, fatty amides and fatty amines. The fatty compound contains at least 10 carbon atoms and the nonionic material contains an average of less than 8 alkylene oxide groups per molecule.

Alkylene oxide adducts of fatty alcohols useful in the present invention, preferably have the general formula:

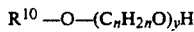

wherein $R^{10}$ is an alkyl or alkenyl group having at least 10 carbon atoms, most preferably from 10 to 22 carbon atoms, y is preferably not more than 10, such as from 0.5 to about 3.5, and n is 2 or 3. Examples of such materials include Synperonic A3(ex ICI), which is a $C_{13}$-$C_{15}$ alcohol with about three ethylene oxide groups per molecule, and Empilan KB3 (ex Marchon) which is lauric alcohol 3EO.

Alkylene oxide adducts of fatty acids useful in the present invention, preferably have the general formula:

$$R^{10}-C-O\ (C_nH_{2n}O)_yH,$$

wherein $R^{10}$, n and y are as given above. Suitable examples include ESONAL 0334 (ex Diamond Shamrock), which is a tallow fatty acid with about 2.4 ethylene oxide groups per molecule.

Alkylene oxide adducts of fatty esters useful in the present invention include adducts of mono-, di- or tri-esters of polyhydric alcohols containing 1 to 4 carbon atoms; such as coconut or tallow oil (triglyceride) 3EO (ex Stearine Dubois).

Alyklene oxide adducts of fatty amides useful in the present invention preferably have the general formula:

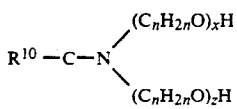

wherein $R^{10}$ is an alkyl or alkenyl group having at least 10 carbon atoms, most preferably from 10 to 22 carbon atoms, n is 2 or 3 and x and z in total are not more than 4.0, preferably from about 0.5 to about 3.5, while one of x and z can be zero. Examples of such materials include tallow monoethanolamide and diethanolamide, and the corresponding coconut and soya compounds.

Alkylene oxide adducts of fatty amines useful in the present invention preferably have the general formula:

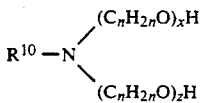

wherein $R^{10}$ and n are as given above, and x and z in total are preferably not more than 4.0, most preferably from about 0.5 to about 3.5. Examples of such materials include Ethomeen T12 (tallow amine 2EO, available from AKZO), Optameet PC5 (coconut alkyl amine 5EO) and Crodamet 1.02 (oleylamine 2EO, available from Croda Chemicals).

Cationic detergent-active materials suitable for use herein include quaternary ammonium surfactants and surfactants of a semi-polar nature, for example amine oxides.

Amounts of amphoteric or zwitterionic detergent compounds can also be used in the composition of the invention, but this is not normally desired owing to their relatively high cost. If any amphoteric or zwitterionic detergent compounds are used, it is generally in small quantities relative to the much more commonly used anionc and/or nonionic detergent-active compounds.

The effective amount of the detergent-active compound or compounds used in the composition of the invention will generally be in the range of from 5 to 50% by weight, preferably from 6 to 30% by weight based on the total composition.

The detergent composition according to the invention may also contain a detergency builder, which can be an inorganic builder or an organic builder, in an amount generally within the range of from about 5% to about 80%, preferably from 10% to 60% by weight.

Examples of phosphorus-containing inorganic detergency builders, when present, include water-soluble salts, especially alkali metal pyrophosphates, orthophosphates and polyphosphates. Specific examples of inorganic phosphate builders include sodium and potassium tripolyphosphtes, phosphates and hexametaphosphates.

Examples of non-phosphorus-containing inorganic detergency builders when present, include water-soluble alkali metal carbonates, bicarbonats, silicates and crystalline and amorphous alumino silicates. Specific examples include sodium carbonate (with or without calcite seeds), potassium carbonates, sodium and potassium bicarbonates and silicates.

Examples of organic detergency builders, when present, include the alkali metal, ammonium and substituted ammonium polyacetates, carboxylates, polycarboxylates, polyacetal carboxylates and polyhydroxysylphonates. Specific examples include sodium, potassium, lithium, ammonium and substituted ammonium salts of ethylenediaminetetraccetic acid, nitrilotriacetic acid, oxydissuccinic acid, melitic acid, benezene polycarboxylic acids and citric acid.

The detergent compositions of the invention may also contain any of the conventional additives in amounts in which such materials are normally employed in fabric-washing detergent compositions or textile washing detergent compositions and which serve to further improve the laundering or scouring characteristics. Examples of these additives include lather boosters, antifoaming agents, alkaline materials such as sodium silicates, fabric softening agents, enzymes such as proteolytic, lipolytic and amylolytic enzymes, corrosion inhibitors, inorganic salts, sequestering agents, bleaching agents, colouring agents and perfumes, so long as these additives do not adversely influence the invention.

In a preferred embodiment the detergent compositions omit fluorescent agents or optical bleaching agents as these additives could change the hue of the original textile or fabric colours.

The detergent compositions of the invention can be manufactured and presented in the form of a powder, including granules, flakes, etc; liquid; paste; or bar or included in a sachet.

Detergent powder compositions according to the invention can be prepared using any of the conventional manufacturing techniques commonly used or proposed for the preparation of fabric washing detergent compositions. These include spray-drying or spray cooling and subsequent dry-dosing of sensitive ingredients not suitable for incorporation prior to the drying or heating step.

A second aspect of the present invention relates to a method of controlling colorant migration in a liquid by contacting said liquid with a sufficient amount of a hydrotalcite-like material of formula I.

Such a method can be effective in removing unwanted colorants including anionic dyes from fabric washing liquors and textile treatment liquors.

The hydrotalcite-like material is present in the liquid in an amount from0.1-30 g/l. Preferably from 0.5 to 10 g/l.

Preparation of hydrotalcite-like compounds is known and has been described in a number of publications including Solid State Ionics 22 (1986) pages 135–141 where there is published a paper by Walter T Reichle entitled "Synthesis of Anionic Clay Minerals (Mixed Metal Hydroxides, Hydrotalcite)" and Chemtech (January 1986) pages 58 to 63 where there is published a paper by Walter T Reichle entitled "Anionic Clay Minerals".

The zinc/aluminium hydrotalcite-like material useful in the present invention may be prepared in one of the following ways or in other ways known in the art:

1. A 1 mol $dm^{-3}$ solution of an 8:1 molar ratio of zinc chloride and aluminium chloride was prepared. To this a 2 mol $dm^{-3}$ solution of sodium hydroxide was added until the original pH of the chloride solution had been increased from around 3 to pH 6.75. This resulted in the formation of a white gel-like precipitate which was separated by centrifuging. The precipitate was then washed by suspension in demineralised water followed by centrifuging. This washing process was repeated several times. The gel was then dried at 80° C. to 100° C. and ground to a fine powder.

2. A 1 mol $dm^{-3}$ solution of an 8:1 molar ratio of zinc chloride and aluminium chloride was prepared and simultaneously pumped into a 5 liter beaker, fitted with a stirrer, along with a 5 mol $dm^{-3}$ solution of sodium hydroxide. The rate of addition of sodium hydroxide was varied to maintain a pH of 6.5 in the reaction mixture. The resulting gel was separated and washed as described above. Particles of the washed precipitate were then dried in different ways:

a) spray dried;
b) slurried in alcohol, filtered and oven dried at 50° C. The resulting precipitate was then hammer milled to form a fine powder;
c) slurried in nonionic surfactant (Synperonic A7 ex ICI) filtered and oven dried at 50° C. The resulting precipitate was then hammer milled to form a fine powder.

A magnesium/aluminium hydrotalcite-like material useful in the present invention may be prepared in the following way or in other ways known in the art.

To 98 liters of water 19.5 kg of sodium hydroxide was added followed by 25 kg of magnesium nitrate and 18.3kg of aluminium nitrate dissolved in 73 lites of water to give a Mg:Al ratio of 3:1. The nitrate solution was added over a period of 30 minutes with stirring. The solution was heated at 90° C. to 100° C. for 2 hours. The resulting precipitate was filtered and washed. The precipitate was treated as follows:

(i) a sample was resuspended in water to give a 10% solids slurry;
(ii) a sample was spray dried; and
(iii) a sample was oven dried at approximately 120° C. and micronised using a fluid energy mill.

3. A magnesium/aluminium hydrotalcite-like material useful in the present invention may be prepared as follows or in other ways known in the art:

An alkali solution comprising 150 liters of a mixed sodium hydroxide/sodium carbonate alkali solution and having a total anion concentration of 5M and a hydroxide to carbonate ratio of 3:1, was added to a vessel containing around 66 liters of demineralised water to raise the pH from neutral to around pH 10.

A solution of aluminum sulphate and magnesium sulphate having a total metal ion concentration of 2M and a magnesium to aluminium ratio of 3:1, was added to the vessel and the vessel contents were agitated. The rate of addition of the sulphate solution was adjusted to maintain a pH in the solution of 10 to 10.5. Immediate precipitation occurred on addition of the sulphate solution however the resulting slurry was cooled to maintain a temperature of 25° C. The reaction time was approximated 50 minutes, plus 10 minutes agitation once addition of the solutions was complete. The slurry was then pressed to form a filter cake and the cake was washed with demineralised water. The wash filtrate was tested for the presence of sulphate anion using barium chloride solution, which indicated that most of the sulphate had been removed from the cake. The cake was then air dried for 1 hour and then passed through a ring drier and then milled in a fluid energy mill to a particle size of 5 to 7 microns.

It has been found that the morphology of hydrotalcite-like materials is dependent on their method of preparation. Especially preferred are methods of preparation which give rise to porous materials such as spray drying.

The following Examples illustrate compositions in accordance with the invention.

EXAMPLE 1

A sample of zinc/aluminium hydrotalcite-like material was prepared as described in method 1 above. The sample was sieved using the following sieve sizes 250 $\mu$m, 106 $\mu$m, 75 $\mu$m and 45 $\mu$m.

The rate of colorant adsorbtion was determined by measuring the absorbance of filtered samples of liquid, as compared to a blank, at timed intervals.

A solution in demineralised water of 1 g/L nonionic surfactant (Synperonic A7 (ex ICI)), 0.01 mol $dm^{-3}$ sodium chloride and 0.01 g/l dyestuff (Direct Red 80: CI 35780) was prepared. 200ml of the solution was placed in a water bath and maintained at a temperature of either 25° C. or 40° C. The solution was stirred at all times. 5 ml samples were withdrawn at timed intervals and filtered through a 0.45 $\mu$m Millipore filter. The absorbance of each sample was determined against a water/nonionic/NaCl standard at 525 nm as measured on a UV/visible spectrophotometer this being the maximum absorption for Direct Red 80. After the first reading 0.14 g of Zinc/aluminum hydrotalcite was added. Samples were then withdrawn at 5, 10 and 20 minute intervals. The results were as follows:

|  | Initial | Absorbance at 525 nm | | |
|---|---|---|---|---|
|  | | 5 mins | 10 mins | 20 mins |
| +250 $\mu$m | | | | |
| 25° C. | 0.279 | 0.190 | 0.154 | 0.108 |
| 40° C. | 0.281 | 0.156 | 0.110 | 0.040 |
| +106-250 $\mu$m | | | | |
| 25° C. | 0.285 | 0.176 | 0.141 | 0.086 |
| 40° C. | 0.275 | 0.117 | 0.072 | 0.030 |
| +75-106 $\mu$m | | | | |
| 25° C. | 0.280 | 0.144 | 0.112 | 0.063 |
| 40° C. | 0.282 | 0.087 | 0.049 | 0.019 |
| +45-75 $\mu$m | | | | |
| 25° C. | 0.283 | 0.127 | 0.065 | 0.026 |
| 40° C. | 0.281 | 0.063 | 0.029 | 0.018 |

These results show that the rate of dye adsorption (as measured by the decrease in absorbance of the filtrate) increases with increasing temperature and/or decreasing particle size.

EXAMPLE 2

A sample of zinc/aluminium hydrotalcite-like material was prepared as described in method 2 above. The average particle size of precipitates dried according to regime (a) spray dried, (b) alcohol and (c) Synperonic were measured by light scattering. The rates of dye adsorption for the samples were determined by the method described in Example 1.

The results were as follows:

|  |  |  | Absorbance at 525 nm | | |
|---|---|---|---|---|---|
|  |  | Initial | 5 mins | 10 mins | 20 mins |
| (a) ZnAl HT spray dried | ) 25° C. | 0.226 | 0.061 | 0.024 | 0.000 |
| APS = ca. 45 μm | ) 40° C. | 0.235 | 0.032 | 0.002 | 0.000 |
| (b) ZnAl HT alcohol | ) 25° C | 0.225 | 0.001 | 0.000 | 0.000 |
| APS = ca. 27 μm | ) 40° C. | 0.215 | 0.007 | 0.000 | 0.000 |
| (c) ZnAl HT synperonic | ) 25° C. | 0.236 | 0.007 | 0.000 | 0.000 |
| APS = ca. 15 μm | ) 40° C. | 0.223 | 0.008 | 0.000 | 0.000 |

From these results it can be seen that the method of preparation of the hydrotalcite-like material has a great effect on the rate of dye adsorbtion. This is thought to be due to the dependence of porosity on the method of drying.

EXAMPLE 3

From Example 2 it can be seen that the faster materials adsorb all the dye within five minutes. The rate of dye adsorbtion for an extended range of hydrotalcite-like materials was determined using the method of Example 1 except samples were removed at 1 minute intervals for the first five minutes.

Magnesium/aluminium hydrotalcite-like materials were prepared as described above and treated as described in (i) slurry, (ii) spray dried and (iii) micronised as described above. Additionally a micronised sample of the spray dried Zinc/aluminium hydrotalcite was tested. (labelled ZnAlHT micronised). The results are as follows:

|  |  |  | Absorbance at 525 nm | | | | |
|---|---|---|---|---|---|---|---|
|  |  | Initial | 1 | 2 | 3 | 4 | 5 |
| (a) ZnAl HT spray dried | ) 25° C. | 0.250 | 0.187 | 0.146 | 0.121 | 0.101 | 0.085 |
| APS = ca. 45 μm | ) 40° C. | 0.225 | 0.141 | 0.092 | 0.067 | 0.046 | 0.032 |
| ZnAl HT micronised | ) 25° C. | 0.253 | 0.008 | 0.003 | 0.000 | — | — |
| APS = ca. 9 μm | ) 40° C. | 0.230 | 0.006 | 0.003 | 0.000 | — | — |
| (b) ZnAl HT alcohol | ) 25° C. | 0.248 | 0.020 | 0.004 | 0.000 | — | — |
| APS = ca. 27 μm | ) 40° C. | 0.240 | 0.014 | 0.002 | 0.000 | — | — |
| (iii) MgAl HT micronised | ) 25° C. | 0.234 | 0.010 | 0.002 | 0.000 | — | — |
| APS = ca. 6 μm | ) 40° C. | 0.235 | 0.015 | 0.008 | 0.002 | 0.000 | — |
| (i) MgAl HT slurry | ) 25° C. | 0.229 | 0.012 | 0.001 | 0.000 | — | — |
| APS = ca. 13 μm | ) 40° C. | 0.229 | 0.014 | 0.002 | 0.000 | — | — |
| (ii) MgAl HT spray dried | ) 25° C. | 0.232 | 0.180 | 0.148 | 0.128 | 0.114 | 0.102 |
| APS = ca. 29 μm | ) 40° C. | 0.259 | 0.155 | 0.106 | 0.079 | 0.060 | 0.049 |

These results show the particularly fast adsorption rate obtained when samples are micronised. The performance of alcohol treated samples is only slightly slower than the micronised samples.

EXAMPLE 4

The effect of hydrotalcite-like materials on dye transfer under fabric washing conditions was assessed as follows A wash liquor containing 0.8 g/l nonionic active (Synperonic A7), 1.75 g/l zeolite (Wessalith P ex. Degussa), 0.5 g/l sodium sulphate and 0.5 g/l sodium carbonate was prepared using 26.2° FH. water with a Ca:Mg ratio of 2:1 and placed on a tergotometer. Four 3in×3 in pieces of coloured cotton test cloth and four 3in×3 in pieces of white desized cotton sheeting were washed in 500 ml of liquor for 20 minutes at 40° C. The liquor to cloth ratio was 60:1.

The coloured test cloths were dyed with either 1% Direct Green 26 CI 34045 ex ICI, 1% Direct Blue 25 CI 23790 ex ICI or 1% Direct Red 80 CI 35780 ex ICI.

0.5 g/l of Zn/Al HT prepared according to method 2 above and spray dried was optionally added.

Dye transfer was measured as an average colour change for the four white cloths by CIE LAB delta E values for the wavelength range 460-700 nm. The lower the value of delta E, the smaller the degree of dye transfer. The results were as follows:

|  | Delta E (D65 illuminant 10° observer) | |
|---|---|---|
| Dye | Without Zn/AlHT | With Zn/AlHT |
| Direct Green 26 | 1.9 | 1.04 |
| Direct Blue 25 | 22.09 | 11.67 |
| Direct Red 80 | 16.84 | 6.91 |

These results show the reduction in dye transfer obtained by using hydrotalcite-like materials according to the invention.

EXAMPLE 5

The effect of hydrotalcite-like materials on dye transfer under fabric washing conditions using a load of mixed coloured fabrics was assessed in automatic washing machines as follows.

A detergent composition comprising:

| 14.4 g | Synperonic A7 |
| 31.5 g | Zeolite |
| 9 g | sodium carbonate |
| 9 g | sodium sulphate |
| 9 g | various hydrotalcite materials as prepared above (optional) | was dosed to the dispenser of a Miele W754S set on the 40° C. cottons wash cycle.

24 cotton test cloths comprising 6 cloths dyed With Direct Green 26, 6 cloths dyed with Direct Blue 25, 6 cloths dyed with Direct Red 80 and 6 cloths of undyed white cotton sheeting were placed in the machine. 24 in×12 in pieces of knitted polyester were added to the machine to make up wash loads of 1,2, 3 or 4 kg with liquor to cloth ratios of 18:1, 9:1, 6:1 and 4.5:1 respectively. The knitted polyester has a diluent effect since direct dyes have no affinity for polyester.

The tests were performed in duplicate and average delta E values were determined as in Example 4.

The results were as follows:

| | DELTA E Machine Load, Kg | | | |
|---|---|---|---|---|
| | 1 | 2 | 3 | 4 |
| No HT | 2.36 | 1.81 | 1.07 | 0.83 |
| ZnAl HT spray dried | 2.12 | 1.19 | 0.92 | 0.47 |
| MgAl HT slurry | 1.57 | 1.19 | 1.18 | 0.86 |
| MgAl HT spray dried | 1.67 | 1.32 | 0.94 | 0.68 |
| MgAl HT micronised | 1.65 | 1.05 | 0.77 | 0.85 |

These results show the reduction in dye transfer that can be obtained by using hydrotalcite-like materials according to the present invention. For example for the 1 Kg load a delta E value of 2.36 is obtained for a composition containing no hydrotalcite whereas a delta E value of 1.57 is obtained for a composition containing Mg/Al hydrotalcite in a slurry.

EXAMPLE 6

The effect of hydrotalcite-like materials on dye transfer under conditions encountered in industrial textile washing conditions was assessed as follows.

Test cloths were prepared by dyeing wool flannel with 3% by weight of Lanasyn Green 5GL ex Sandoz. Dyed cloths were mixed with an equal weight of undyed wool and agitated on an SDC Wash Wheel at 40° C. for 15 minutes in water containing variously Croscour HVT a nonionic detergent ex Crosfield Textile Chemicals, Croscolor 300 a dispersant/detergent nonionic ex Crosfield Textile Chemicals, Mg/Al HT prepared as described above, oven dried and micronised to a particle size of 5μm and sodium bicarbonate as indicated in the table below. The liquor:cloth ratio was 20:1.

The undyed cloths were assessed for dye transfer using a system of grey scales as described in BSI006 A03:1978. (The higher the grey scale number the lesser the extent of dye transfer). These results show that addition of a hydrotalcite-like compound according to the invention to a textile washing liquor reduces dye transfer.

| Ingredient | Liquor Composition | | | | | |
|---|---|---|---|---|---|---|
| | A | B | C | D | E | F |
| 1 g/l Croscour HVT | / | — | / | / | — | — |
| 0.1 g/l Mg/Al HT | — | / | — | / | / | / |
| 1 g/l sodium bicarbonate | — | — | / | — | / | / |
| 1 g/l Croscolor 300 | — | — | — | — | — | / |
| Grey Scale Staining on undyed cloths | 2-3 | 4-5 | 3 | 3-4 | 3-4 | 4 |

/ denotes that an ingredient was present in the liquor
— denotes that an ingredient was not present in the liquor.

EXAMPLE 7

The effect of hydrotalcite-like materials on dye transfer under conditions encountered in industrial textile washing was assessed as follows.

Test cloths were prepared by dyeing knitted cotton with 1.5% by weight of Solophenyl Bordeaux AZBL ex Ciba Geigy. Dyed cloths were mixed with four times the weight of undyed cotton and agitated at 40° C. for 15 minutes in water containing variously Croscour HVT and Mg/Al Ht as used in Example 6 as indicated in the table below. The liquor:cloth ratio was 20:1.

The undyed cloths were assessed for dye transfer using grey scales as described in Example 6.

| Ingredient | Liquor Composition | | |
|---|---|---|---|
| | G | H | I |
| 1 g/l Croscour HVT | / | — | / |
| 1 g/l Mg/Al HT | — | / | / |
| Grey Scale Staining on undyed cloths | 2 | 4 | 4-5 |

We claim:

1. A detergent composition comprising:
(a) from 5 to 50% by weight of a detergent active system comprising at least 25% by weight of nonionic detergent active based on the weight of the system; and
(b) from 1% to 30% by weight of material as defined in formula I below:

$$M_{k+m}N_{n+p}(OH)_2 A_2^{y-} \cdot x.H_2O \qquad (I)$$

wherein:
M is any 1+ or 2+ cation or combination thereof;
N is any 3+ or 4+ cation or combination thereof;
k is the sum of the individual mole fractions of the 1+ cations;
m is the sum of the individual mole fractions of the 2+ cations;
n is the sum of the individual mole fractions of the 3+ cations;
p is the sum of the individual mole fractions of the 4+ cations;
wherein either but not both of k and m or n and p can be zero, $K+m+n+p=1$ and $A_2^{y-}$ is any anion of charge $y-$ and mole fraction z, or combination of anions of similar or different $y-$;
wherein $k+2m+3n+4p-2-2y=O$; and
wherein x ranges from 1 to 100.

2. A detergent composition as claimed in claim 1 wherein the detergent active system comprises at least 30% by weight of nonionic detergent active based on the weight of the system.

3. A detergent composition as claimed in claim 1 wherein the hydrotalcite-like material has a particle size less than 250 microns.

4. A detergent composition as claimed in claim 1 wherein the hydrotalcite-like material has the following formula:

$$Zn_{16}Al_2(OH)_{36}(Cl_2)xH_2O$$

5. A detergent composition as claimed in claim 1 wherein the hydrotalcite-like material has the following formula:

$$Mg_6Al_2(OH)_{16}(NO_3)_2xH_2O$$

6. A detergent composition as claimed in claim 1 wherein the hydrotalcite material has the following formula:

$$Cu_{16}Al_2(OH)_{36}(Cl_2)xH_2O$$

* * * * *